United States Patent
Austin et al.

(10) Patent No.: US 8,718,411 B2
(45) Date of Patent: May 6, 2014

(54) TUNABLE OPTICAL SUPERCONTINUUM ENHANCEMENT

(75) Inventors: Dane Austin, Oxfordshire (GB);
Benjamin John Eggleton, Camperdown (AU); Carel Martijn De Sterke, Epping (AU); Paul Steinvurzel, Somerville, MA (US); Jeremy Bolger, Redfern (AU); Thomas Brown, Rochester, NY (US); Feng Luan, Hurstville (AU); Dong-Il Yeom, Yongtong-dong (KR)

(73) Assignee: The University of Sydney, Sydney NSW (AU)

( * ) Notice: Subject to any disclaimer, the term of this patent is extended or adjusted under 35 U.S.C. 154(b) by 788 days.

(21) Appl. No.: 12/307,795

(22) PCT Filed: Jul. 5, 2007

(86) PCT No.: PCT/AU2007/000931
§ 371 (c)(1),
(2), (4) Date: Dec. 1, 2009

(87) PCT Pub. No.: WO2008/003138
PCT Pub. Date: Jan. 10, 2008

(65) Prior Publication Data
US 2010/0067555 A1     Mar. 18, 2010

Related U.S. Application Data

(60) Provisional application No. 60/818,978, filed on Jul. 7, 2006.

(51) Int. Cl.
*G02B 6/00*    (2006.01)
*G02B 6/34*    (2006.01)

(52) U.S. Cl.
USPC ............... 385/1; 385/122; 385/28; 385/37; 385/50

(58) Field of Classification Search
USPC ............................................. 385/1
See application file for complete search history.

(56) References Cited

U.S. PATENT DOCUMENTS

| | | | | |
|---|---|---|---|---|
| 6,021,237 | A * | 2/2000 | Kim et al. | 385/28 |
| 2005/0094941 | A1 | 5/2005 | Knox | |
| 2005/0226575 | A1* | 10/2005 | Brown et al. | 385/122 |
| 2005/0226576 | A1* | 10/2005 | Feder et al. | 385/122 |

OTHER PUBLICATIONS

Genty, Goëry, "Supercontinuum generation in microstructured fibers and novel optical measurement techniques," Helsinki University of Technology, Department of Electrical and Communication Engineering, Doctoral Dissertation, 2004.
International Search Report for PCT International Application No. PCT/AU2007/000931, mailed Aug. 27, 2007.

* cited by examiner

*Primary Examiner* — Eric Wong
(74) *Attorney, Agent, or Firm* — RatnerPrestia

(57) ABSTRACT

A method and apparatus for providing optical supercontinuum. The method comprises creating a spectrally narrow phase feature within a supercontinuum spectrum produced from a laser pulse that has been subjected to supercontinuum generation, thereby producing a modified supercontinuum spectrum, and propagating the modified supercontinuum spectrum through an optical waveguide that is suitable for supercontinuum generation, thereby further modifying the modified supercontinuum spectrum. The method may include modifying the modified supercontinuum spectrum by increasing its energy in a vicinity of the phase feature.

32 Claims, 7 Drawing Sheets

TUNABLE OPTICAL SUPERCONTINUUM ENHANCEMENT

RELATED APPLICATION

This application is a U.S. National Phase Application of PCT International Application No. PCT/AU1007/000931, filed Jul. 5, 2007 which claims the benefit of the filing date of U.S. application No. 60/818,978 filed 7 July 2006, the content of which is incorporated herein by reference in its entirety.

FIELD OF THE INVENTION

The present invention relates to a method and apparatus for modifying optical supercontinuum, including a tunable method and apparatus for doing so, of particular but by no means exclusive application in the enhancement of supercontinuum such as for providing improved frequency metrology.

BACKGROUND OF THE INVENTION

Supercontinuum generation is the dramatic spectral broadening of an intense laser pulse as it propagates through a transparent material or waveguide. The resulting light spans a wide frequency range yet retains the intensity and coherence properties of its laser source. There are many potential uses for supercontinuum generation, including optical coherence tomography, experimental sources for spectrography and optical frequency metrology. The properties of an optical supercontinuum can be coarsely adjusted by varying both the initial laser pulse and the properties of the material or waveguide. For example, U.S. Patent Application No. 20050094941 (Knox), entitled Fiber device with high nonlinearity, dispersion control and gain, discloses a method for modifying the properties of supercontinuum generation by tapering an optical fiber, in order to modify the dispersion properties of the waveguide and thereby increase supercontinuum generation in certain spectral regions. However, this technique modifies the overall dispersion characteristic of the waveguide so, while the resulting spectral enhancement is substantial, it is broad and not targeted at a specific wavelength. Additionally, since the effect of the tapering is critically dependent upon the initial waveguide characteristic, the exact method of creating enhancement is hard to predict without extensive modelling and trial runs on the waveguides to be used.

U.S. Patent Application No. 20050226576 (Feder et al.), entitled Enhanced supercontinuum generation in highly nonlinear fibers using post-fabrication processing, discloses a method of modifying a waveguide with the object of enhancing the supercontinuum within a restricted spectral region, employing post-processing of a fiber with UV laser illumination over some finite length of the waveguide used to generate supercontinuum. However, this approach—like that of Knox—acts to modify a large part of the spectrum, so has similar shortcoming to Knox with regard to sharpness of feature and ease of use.

For certain applications—such as optical frequency metrology—it is advantageous to increase the intensity in narrow spectral regions of the supercontinuum. Such a narrow-band spectral enhancement is disclosed in U.S. Patent Application No. 20050226575 (Brown et al.), entitled Enhanced supercontinuum generation in highly nonlinear fibers using strong Bragg gratings, which discloses the use of a narrow reflective resonant structure such as a fiber Bragg grating in order to modify the dispersion of a restricted region of a waveguide and thereby to enhance a supercontinuum formed subsequently after further propagation. Such resonant structures are very narrow and are easily fabricated in order to cover a chosen narrow wavelength band. However they are designed and created at a chosen wavelength position. Dynamic tuning of the spectral position of a fiber Bragg grating after its inscription in an optical fiber is possible only over a small wavelength range.

SUMMARY OF THE INVENTION

According to a first broad aspect of the present invention there is provided a method for providing optical supercontinuum, comprising:

creating a spectrally narrow phase feature within a supercontinuum spectrum produced from a laser pulse that has been subjected to supercontinuum generation, thereby producing a modified supercontinuum spectrum; and propagating the modified supercontinuum spectrum through an optical waveguide (such as a length of optical fiber) that is suitable for supercontinuum generation, thereby further modifying the modified supercontinuum spectrum (such as by increasing its energy in the vicinity of the phase feature).

The invention combines the advantages of spectral enhancement within a small wavelength region with broad tunability over a much larger range of wavelength than is possible with a fiber Bragg grating. This avoids the limitations of the background art, which required the restricted use of a resonant dispersive feature utilizing a reflective geometry in order to create the desired effect. The present invention can use essentially any spectral phase feature, thereby permitting a wider range of waveguide or other phase front modifications to be made. Such modifications are not restricted to those operating via reflection, and are not restricted to resonances placed within the waveguide itself.

The method may include performing the supercontinuum generation (such as in an initial optical waveguide, which may also comprise an optical fiber) before creating the spectrally narrow phase feature. In such embodiments, the method may include performing the supercontinuum generation in a microstructured fiber, such as a microstructured photonic crystal fiber (PCF). Alternatively, the method may include performing the supercontinuum generation in an optical fiber with a dispersion zero close to an operating wavelength of the source of the laser pulse.

In another embodiment, the method includes creating the spectrally narrow phase feature within the supercontinuum spectrum while propagating the modified supercontinuum spectrum through the optical waveguide. In this embodiment, the phase feature and the spectral enhancement evolve simultaneously.

The method may further comprise tuning the phase feature, such as by selecting characteristics (including spectral position) of the phase feature according to a desired modification of the supercontinuum.

Furthermore, the method may further comprise dynamically tuning the phase feature.

Thus, the method may be tunable and even dynamically tunable, that is, the characteristics and/or position of the phase feature may be selected to effect a particular enhancement of the supercontinuum, and altered dynamically.

The method may include creating the phase feature with a long period grating. A long period grating is usually regarded as having a period of at least 10 times the incident wavelength which, in the context of a supercontinuum spectrum, is essentially the wavelength of the carrier signal of the laser pulse subjected to supercontinuum generation.

Long period gratings transfer light between two different co-propagating modes and so do not operate via reflection. They also have much longer pitches than fiber Bragg gratings, which permits creation by macroscopic techniques, such as stress templates, which can have their period adjusted dynamically via mechanical techniques including angle tuning.

A long period grating may be fixed or tunable.

For example, the method may include creating the phase feature with an acoustically created long period grating (typically with the grating induced in a fiber by external perturbation by acoustic wave). In this embodiment, the method may include controlling the position of the enhancing of the supercontinuum spectrum by adjusting the acoustic frequency employed in creating the long period grating.

The method may include creating the spectrally narrow phase feature with a waveguide with a fixed long period grating (such as produced by micro-bend stress). The grating couples light from the fundamental mode into higher order modes of the waveguide, thereby creating a loss region and a corresponding phase feature.

In one embodiment, the method includes creating the spectrally narrow phase feature with a tunable acoustic standing wave generated in a waveguide, which also creates a long period grating, coupling light into higher order modes and a loss and the phase feature.

Thus, the phase feature can be created by exciting acoustic waves in a waveguide. The acoustic frequency can be modified, which changes the period of the induced flexural microbend grating, and by this method the position of the spectral phase enhancement can be broadly tuned to different regions in the supercontinuum spectrum.

In another embodiment, the method includes creating the spectrally narrow phase feature within the supercontinuum spectrum in a non-fiber based device (such as a separate spatial light modulator placed into a pulse spectral shaping assembly, such as described by Kan'an and Weiner [19]).

The steps of the method may be performed in distinct sections of waveguide, each selected to optimize or otherwise control the step performed therein. For example, the method may include creating the spectrally narrow phase feature in a waveguide chosen for its ability to sustain a tunable acoustic grating of the desired wavelength.

The method may include creating the spectrally narrow phase feature with a rocking filter in a birefringent waveguide, to couple the polarisation modes of the waveguide and create a loss region for one of the polarisation modes of the waveguide.

In a particular embodiment, the method includes creating the spectrally narrow phase feature with a phase plate (e.g. liquid crystal spatial light modulator) in a pulse spectral shaping assembly. Alternatively, the method may include creating the spectrally narrow phase feature with a narrow loss feature (which also could be accomplished with a spatial light modulator) in the image plane of a pulse spectral shaping assembly.

In a second aspect, the present invention provides a supercontinuum enhancing apparatus, for performing the method described above.

In another aspect, the present invention provides a supercontinuum light source (such as for frequency metrology and spectroscopy), for performing the method described above.

It is envisaged that, in certain embodiments, the supercontinuum light source would have features comparable to those of a conventional supercontinuum source, including high intensity and spatial coherence, but would additionally have a (preferably widely) tunable spectral enhancement that would be brighter than other regions within the supercontinuum spectrum. This increased spectral intensity at a chosen wavelength would improve the accuracy of frequency metrology (of the type discussed by Kim et al. [13]).

BRIEF DESCRIPTION OF THE DRAWING

In order that the invention may be more clearly ascertained, embodiments will now be described, by way of example, with reference to the accompanying drawing, in which.

DETAILED DESCRIPTION

Figure 1:
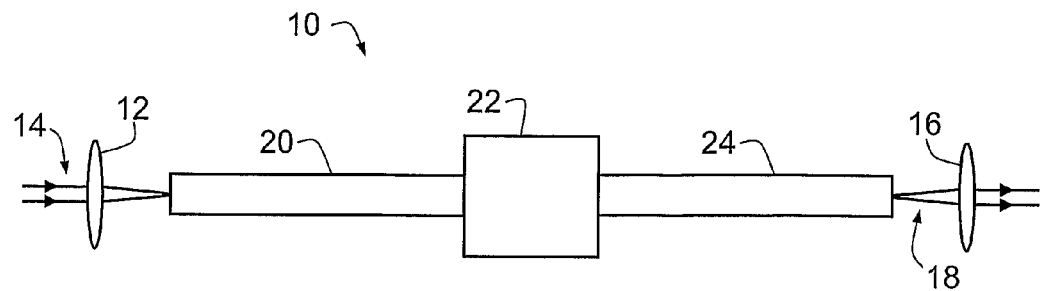
FIG. 1 is a schematic view of an apparatus for providing an enhanced optical supercontinuum according to a first embodiment of the present invention.

An apparatus for enhancing optical supercontinuum is shown generally at 10 in FIG. 1 together with converging lens 12 for focusing a train of input laser pulses 14 into apparatus 10 and a collimating lens 16 for collimating light 18 emerging from apparatus 10.

Apparatus 10 itself comprises three components: a waveguide in the form of first supercontinuum fiber 20, a component 22 for creating a spectrally narrow phase feature within the supercontinuum spectrum emitted by first supercontinuum fiber 20, and another waveguide in the form of second supercontinuum fiber 24 for receiving the supercontinuum spectrum modified by component 22 and subjecting it to further supercontinuum generation.

First and second fibers 20, 24 may be of any type suitable for supercontinuum generation, such as a standard microstructured fiber of the type provided by Crystal Fibre A/S. They may alternatively be provided in a standard optical fiber designed in order to make the dispersion zero of the fiber lie close to the operating wavelength of the source of the laser pulses. First and second fibers 20, 24 may be identical, or may be different and selected specifically for the purpose of optimum spectral enhancement in the region of interest for the tuning stage.

Figure 2:
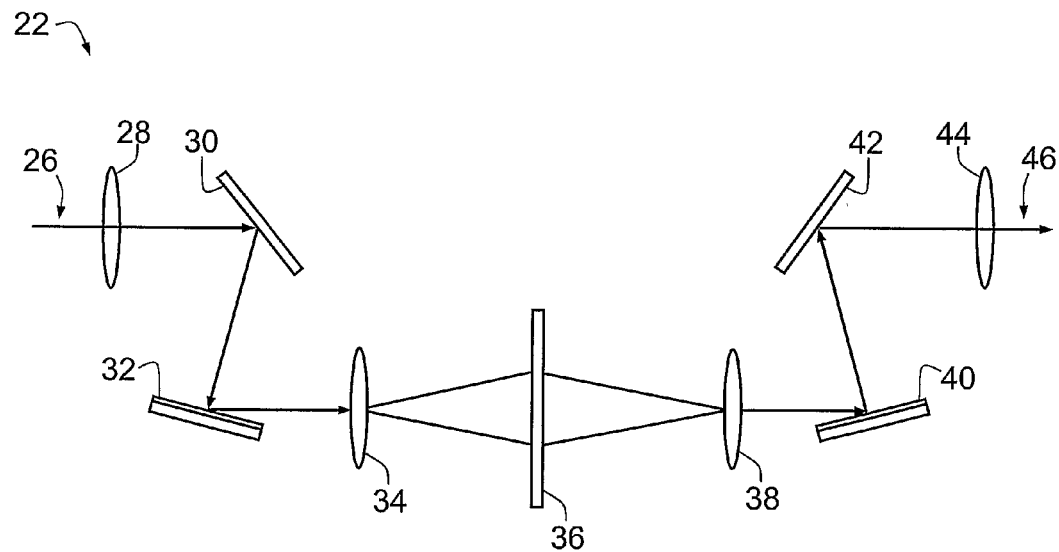
FIG. 2 is a schematic view of the component of the apparatus of FIG. 1 that creates a spectrally narrow phase feature.

Component 22 may assume many different forms. In the first embodiment it comprises a spectral pulse shaper, illustrated schematically in FIG. 2. The supercontinuum spectrum generated in first supercontinuum fiber 20 enters the spectral pulse shaper at 26, is collimated by first collimating lens 28 onto first plane mirror 30, which directs the spectrum toward first diffraction grating 32. The resulting diffraction pattern is imaged by second lens 34 on spatial light modulator 36, then collected by third lens 38 and—in collimated form—directed towards second diffraction grating 40. Second plane mirror 42 reflects the modified spectrum from second diffraction grating 40 towards fourth (focusing) lens 44, after which the modified supercontinuum spectrum 46 exits the spectral pulse shaper (and is directed to second supercontinuum fiber 24 for further modification).

In use, apparatus 10 operates in three consecutive phases. Laser pulses entering the first supercontinuum fiber 20 are subjected to supercontinuum generation within fiber 20 and hence broadened. The broadened laser pulse is then received by component 22 as a supercontinuum spectrum, within which component 22 creates a spectrally narrow phase feature, hence creating a modified supercontinuum spectrum. The modified supercontinuum spectrum is then transmitted into second supercontinuum fiber 24 and, in propagating along fiber 24, is subjected to further supercontinuum generation, further modifying the supercontinuum spectrum in the vicinity of the phase feature.

Figure 3A:
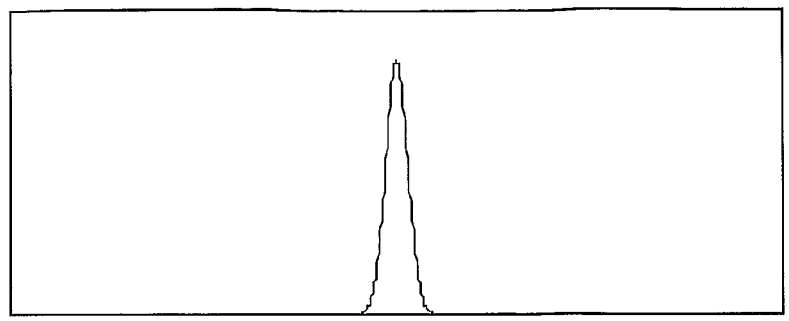
FIGS. 3A, 3B, 3C and 3D are plots of spectral shape at successive stages of the enhancement provided by the apparatus of FIG. 1.
Figure 3B:
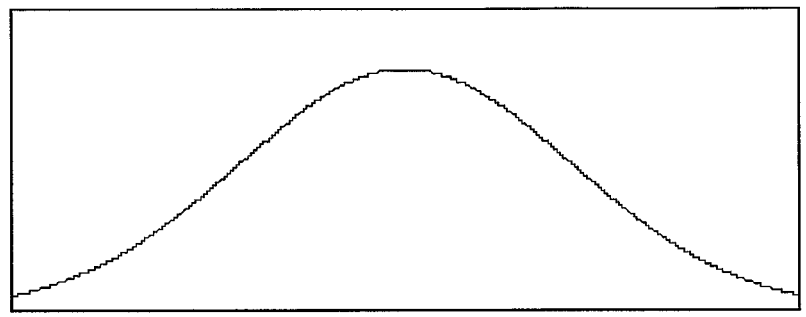
Figure 3C:
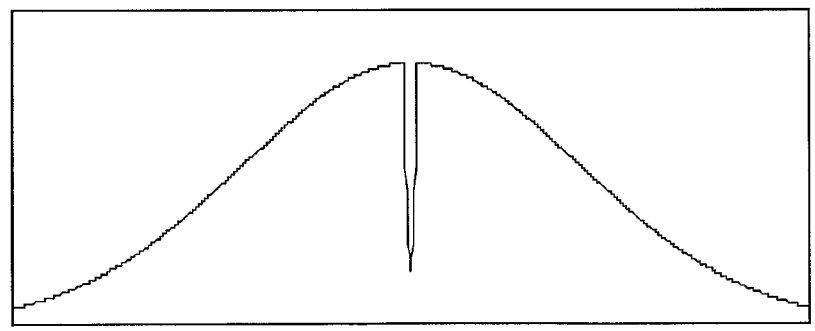

FIGS. 3A to 3D illustrate the evolution of the laser pulse and supercontinuum spectrum as they pass through apparatus 10. FIG. 3A is a plot of the shape of the input laser pulse 14. FIG. 3B illustrates the same pulse after it has been broadened by first supercontinuum fiber 20 and hence is in the form of a supercontinuum spectrum. FIG. 3C illustrates the effect of component 22: the spectrally narrow phase feature has been created within the supercontinuum spectrum. As will be appreciated by those skilled in the art, this phase feature may be a loss feature or a phase-only feature in the supercontinuum spectrum. The example illustrated in FIG. 3C is a loss feature.

Figure 3D:
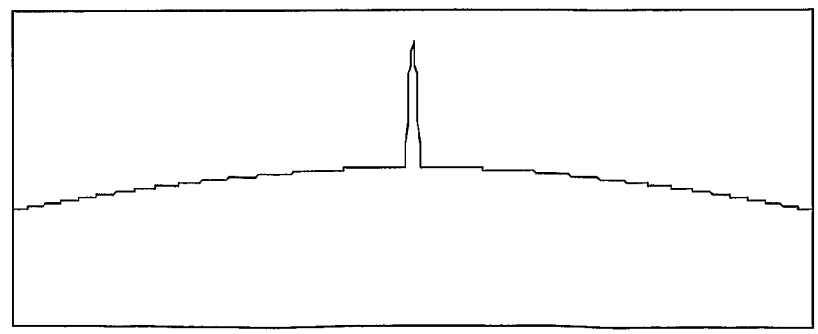

Thus, the modified supercontinuum spectrum shown in FIG. 3C is that which exits component 22 and enters second supercontinuum fiber 24. This modified supercontinuum spectrum is propagated along second supercontinuum fiber 24, which effects further supercontinuum broadening, so the supercontinuum spectrum exits second supercontinuum fiber 24 in a further modified form. Further supercontinuum broadening has occurred and, as shown in FIG. 3D the region in the vicinity of the phase feature has undergone enhancement.

Figure 4:
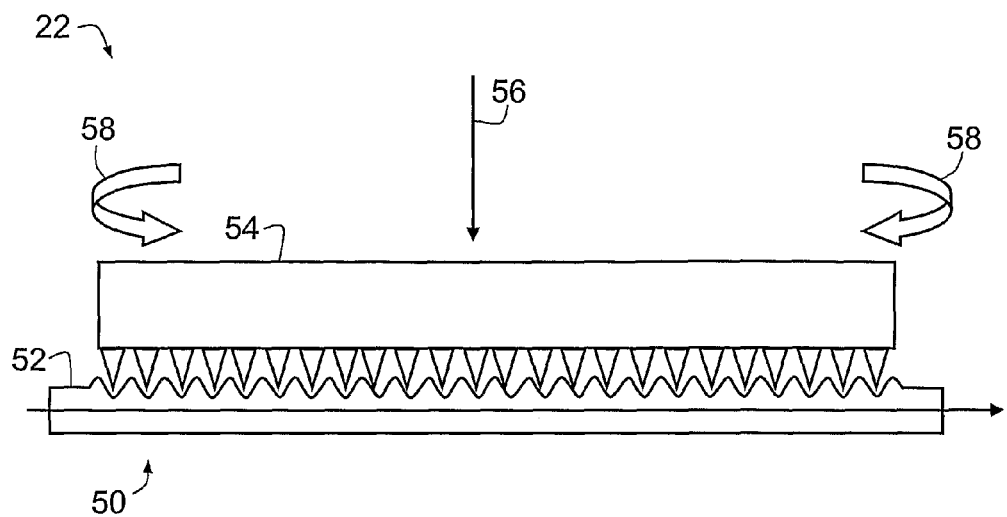
FIG. 4 is a schematic view of a component for creating a spectrally narrow phase feature in the apparatus of FIG. 1, according to a second embodiment of the present invention.

The characteristics of the phase feature, including its position, may be controlled and, indeed, may be controlled dynamically (including while apparatus 10 is in use). FIG. 4 is a schematic view of a component 22 according to another embodiment of the present invention, also for use with the apparatus of FIG. 1, in which this is apparent.

Referring to FIG. 4, in this embodiment component 22 employs a micro-bend long period grating. Component 22 comprises a coated optical fiber 50 with an induced long period grating 52. The long period grating 52 is created by means of a stress plate in the form of a threaded rod 54 pressed against the optical fiber 50 by the application of force in direction 56, which creates a periodic modification to the refractive index of the optical fiber. The induced modification to the refractive index causes coupling of a band of wavelengths from the fundamental guided mode of the optical fiber to a forward propagating mode which is less well confined and subsequently leaks away or is removed by bending, coupling or perturbation. The narrow band of wavelengths that interact with the grating comprise the phase feature impressed onto the supercontinuum, which propagates otherwise unaffected in the fundamental guided mode through the location of the grating. The characteristics of the phase feature are tuned by rotating the threaded rod 54 (about a vertical axis in the view of FIG. 4, as schematically shown by arrows 58); the angle of the axis of the rod relative to that of the optical fiber thus varies the period of the long period grating 52 created in the optical fiber 50 and hence the spectral position of the phase feature.

Figure 5:
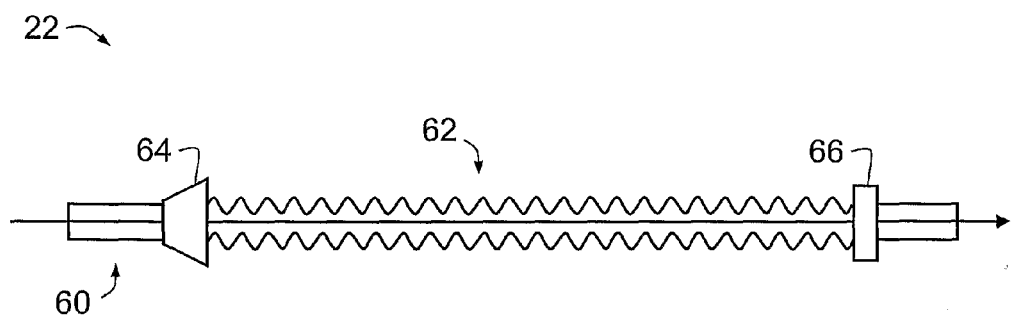
FIG. 5 is a schematic view of a component for creating a spectrally narrow phase feature in the apparatus of FIG. 1, according to a third embodiment of the present invention.

FIG. 5 is a schematic view of component 22 according to another embodiment, also for use with the apparatus of FIG. 1 and for tunably creating a phase feature.

In this embodiment component 22 employs an acoustic long period grating. Component 22 comprises an optical fiber 60 with a section that, in use, constitutes a flexural acoustic micro-bend grating 62, located between an upstream acoustic transducer 64 and a downstream acoustic damper 66.

In this embodiment, the phase feature is created by exciting acoustic waves in the grating portion 62 of the fiber 60 with the acoustic transducer 64. The acoustic frequency output by the acoustic transducer can be modified, which changes the period of the induced flexural micro-bend grating, and by this method the position of the phase feature and hence spectral enhancement can be broadly tuned to different regions in the supercontinuum spectrum.

The phase feature may be created in a dynamically tunable manner by this or any other suitable technique. One such technique is described in U.S. Pat. No. 6,021,237 (Kim et al.). Kim et al. teach an all-fiber acousto-optic tunable filter in which acoustic wave-based long period gratings are excited in optical fibers; their approach permits tunability of the wavelength at which coupling to a leaky forward-propagating mode of an optical waveguide occurs, by adjusting an acoustic driving frequency.

Optical fiber 60—because an acoustic long period grating 62 is to be excited in it—is preferentially selected to be adapted for that purpose and hence is different from first and second fibers 20 and 24. It may comprise SMF600 fiber or a post-processed PCF treated by tapering, etching or hole collapse, or any other type of optical fiber selected for its suitability for long period grating fabrication and for coupling to the supercontinuum fiber.

Fiber 50 of FIG. 4 and fiber 60 of FIG. 5 are spliced to the supercontinuum fibers 20 and 24 by a low-loss splice in a fusion splicer. They may alternatively be connected to the supercontinuum fibers 20, 24 by butt-coupling, but this produces a non-permanent setup so may be undesirable in some applications.

Figure 6:
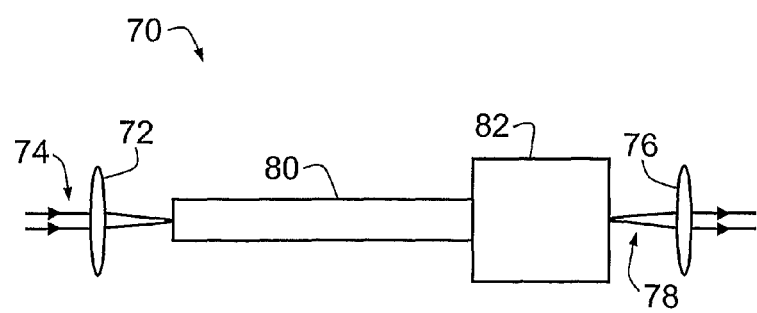
FIG. 6 is a schematic view of an apparatus for providing an enhanced optical supercontinuum according to a fourth embodiment of the present invention.

FIG. 6 is a schematic view of an apparatus for enhancing optical supercontinuum according to another embodiment of the present invention, shown generally at 70, together with converging lens 72 for focusing a train of input laser pulses 74 into apparatus 70 and a collimating lens 76 for collimating light 78 emerging from apparatus 70.

In this embodiment, the spectrally narrow phase feature is created within the supercontinuum spectrum while propagating through what in the embodiment of FIG. 1 is the second optical fiber. In this embodiment, therefore, the phase feature and the spectral enhancement evolve simultaneously. Thus, apparatus 70 includes a waveguide (cf. first supercontinuum fiber 20 of FIG. 1) in the form of a supercontinuum fiber 80 for subjecting laser pulses entering supercontinuum fiber 80 to supercontinuum generation. Apparatus 70 also includes a component 82 for receiving the supercontinuum spectrum from supercontinuum fiber 80 and both creating in the supercontinuum spectrum a spectrally narrow phase feature and subjecting the supercontinuum spectrum to further supercontinuum generation. For example, component 82 may be in the form of one of the components shown in either FIG. 4 or 5, but with fibers 50 or 60 respectively in a form suitable for supercontinuum generation.

Thus, with the apparatuses of the present invention is it envisaged that narrower spectral enhancement features may be provided, and that such features will be conveniently tunable.

EXAMPLE 1

Spectral enhancement of supercontinuum created in highly non-linear fiber was demonstrated using an apparatus for enhancing optical supercontinuum comparable to that shown at 10 in FIG. 1. As is described below, a spectrally tunable narrow-band enhancement was generated in the supercontinuum. Up to 7.5 dB enhancement was demonstrated, and it was shown that this notch could be temporarily removed by fluid immersion. The experimental results agreed well with simulations.

Figure 7:
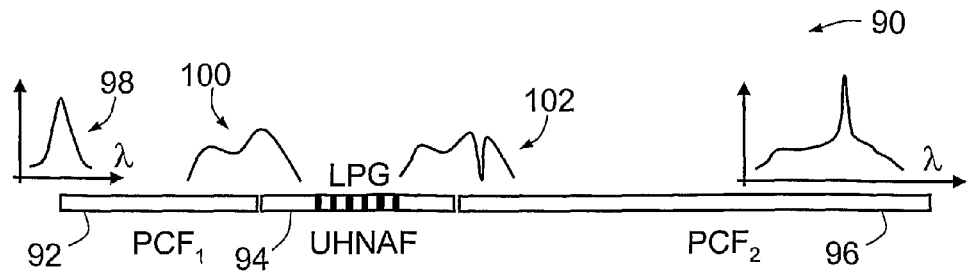
FIG. 7 is a schematic view of an experimental device for providing an enhanced optical supercontinuum, constructed according to the first embodiment of the present invention.

The experimental device is illustrated schematically at 90 in FIG. 7. The apparatus comprises three stages, comprising respective fibers 92, 94, 96 (cf. the three components of apparatus 10 of FIG. 1: first supercontinuum fiber 20, component 22 for creating the spectrally narrow phase feature and second supercontinuum fiber 24). Each of the three fibers 92, 94, 96 was selected to optimize device performance. The first stage comprises first fiber 92, in the form of highly non-linear $PCF_1$, through which an ultrafast laser pulse 98 is propagated. The initially transform-limited pulse is converted into a broadband supercontinuum 100, such that the broadened spectrum is wide enough to cover the range of the chosen resonant wavelengths of a long period grating (LPG) in the second stage.

An LPG [15], [16] is a filter that induces phase and loss features near its resonant frequencies, and which generally exhibits a number of such resonances created by coupling of the fiber core mode to one of several cladding modes. As these resonant frequencies are associated with modes of the fiber cladding, they are sensitive to the fiber's environment and so they can be widely tuned or even be extinguished by external means [17].

Thus, the second stage comprises second fiber 94, which is in the form of an ultra-high-numerical-aperture fiber (UHNAF) selected for mode matching to initial fiber 92 ($PCF_1$) and in which an LPG has been written. The output of $PCF_1$ is coupled into second fiber 94, in which the phase velocity of the propagating light is modified near the resonant coupling wavelengths of the LPG [18]; this leads to a different phase development around the resonances.

Figure 8:
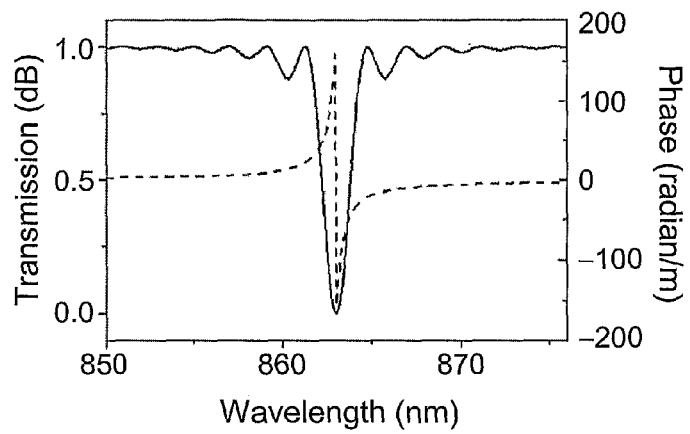
FIG. 8 is a plot of the results of a calculation of the phase variation and amplitude loss of the light near a resonance after propagation through an LPG roughly corresponding to the LPG of the device of FIG. 7.

The third stage comprises third fiber 96, in the form of $PCF_2$. Light propagated into $PCF_2$ after the LPG and coupled into the cladding modes by the LPG is lost by absorption in the jacket of third fiber 96, resulting, at low intensities, in sharp spectral loss features. FIG. 8 is a plot of the results of a calculation of the phase variation and amplitude loss of the light near a resonance after propagation through the LPG for $\kappa L=\pi/2$, roughly corresponding to the one used.

The supercontinuum 102, modified by the LPG, is now coupled into $PCF_2$, chosen for high non-linearity and low dispersion. After non-linear propagation, this results in a spectral enhancement near the LPG resonance. The spectral enhancement can be tuned in wavelength and magnitude either by heating or by changing the refractive index of the medium around the LPG.

Figure 9:
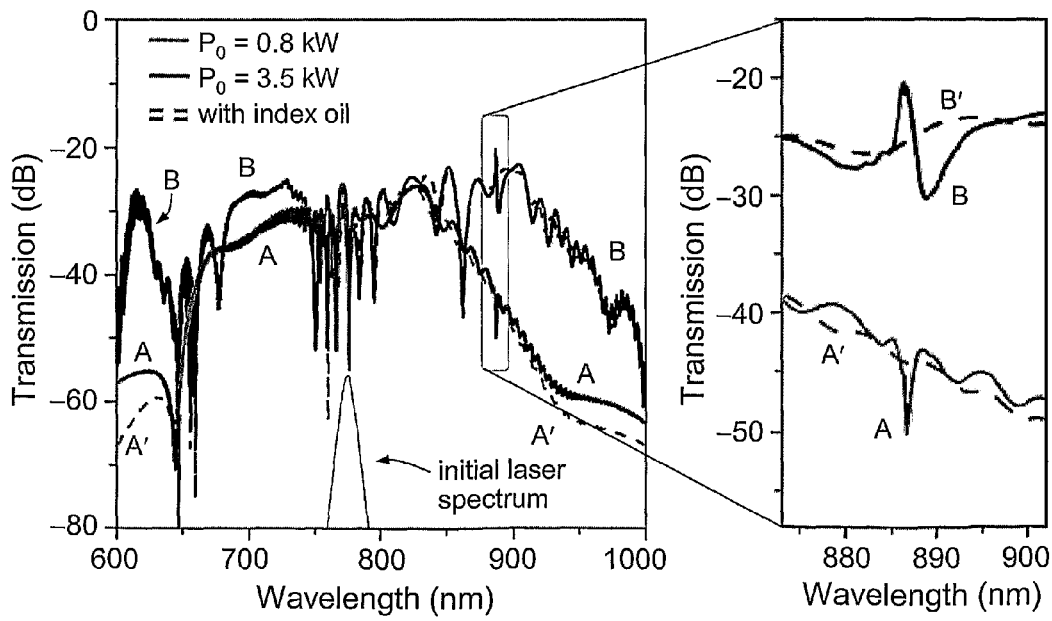
FIG. 9 shows simulated results of spectral intensity after low- and high-intensity propagation through the device of FIG. 7 obtained by solving the generalized non-linear Schrödinger equation, augmented by terms describing the effect of the LPG.

FIG. 9 shows simulated results of the spectral intensity after low- and high-intensity propagation through device 90 obtained by solving the generalized non-linear Schrödinger equation, [4], augmented by terms describing the effect of the LPG. (Without loss of generality only a single LPG resonance near 887 nm is included in the simulation for simplicity.) Propagation through the device 90 was modelled for peak powers of $P_0$=0.8 kW (curves A) and 3.5 kW (curves B). The expanded region in the right register of FIG. 9 show expanded views of the spectrum near the LPG resonance at the (top) high power and (bottom) lower power. The dashed curves A', B' are the corresponding spectra in the absence of the grating. The expanded region shows that the supercontinuum spectrum at low powers contains a narrow, deep loss feature. At high powers, this loss transforms into a sharp spectral enhancement of ~7.5 dB compared with the level in absence of LPG (dashed curve).

Referring again to FIG. 7, in the present experiment $PCF_1$ had a length of 50 mm with a mode field diameter of 1.4 µm, numerical aperture of 0.42, a non-linear coefficient $\gamma=0.104$ $W^{-1} m^{-1}$, and a dispersion zero at 749 nm. The input pulses were generated by a mode-locked Ti:sapphire laser emitting 75 fs FWHM pulses at 777 nm, and were broadened in this fiber 92. The LPG was written in second fiber 94, comprising a short (50 mm) length of hydrogen-loaded Nufern UHNAF. This fiber 94 had second mode cutoff at 900 nm, a numerical aperture of 0.35, and a mode-field diameter of ~2 µm. The LPG, inscribed by UV exposure, has a length L=20 mm, with an absorption notch depth of 8 dB. The first two fibers 92, 94 were spliced together with a loss of 1.5 dB. $PGF_2$ was a 700 mm length of a PCF with a dispersion zero at 868 nm and a non-linear coefficient of $\gamma=0.049$ $W^{-1} m^{-1}$, spliced with a 1 dB loss onto the UHNAF. This second PCF generated strong self-phase modulation of the perturbed supercontinuum pulse.

Figure 10:
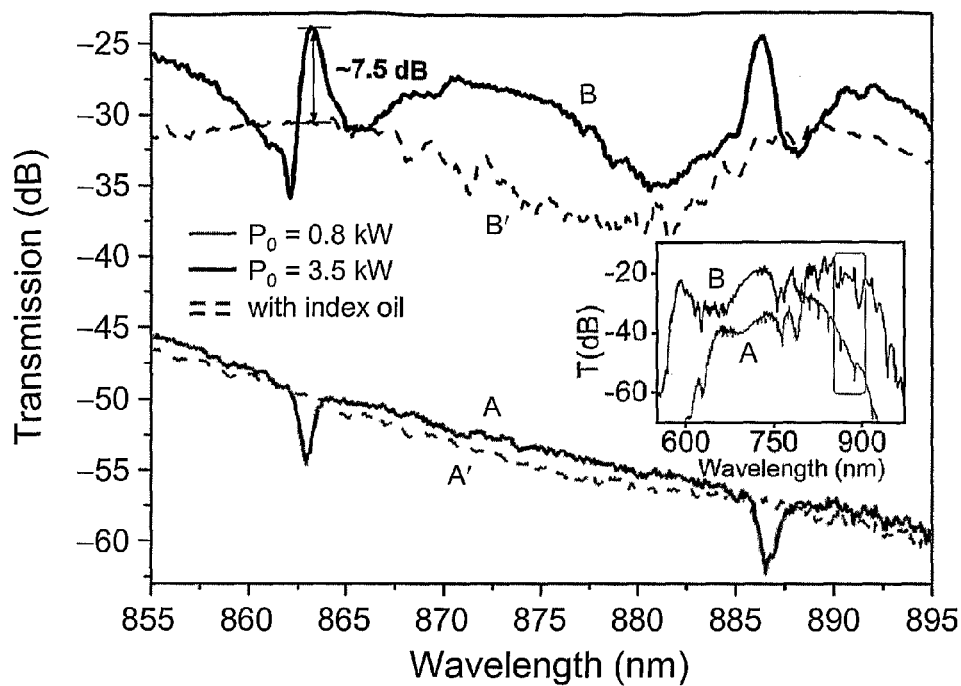
FIG. 10 comprises plots of output spectra measured with the device of FIG. 7 at peak power levels of 0.8 kW and 3.5 kW, showing two LPG resonances.

FIG. 10 comprises plots of the measured output spectra at peak power levels of $P_0$=0.8 kW (curve A) and 3.5 kW (curve B) showing two LPG resonances. The two dashed curves (A', B' respectively) are corresponding spectra when the LPG is removed by immersing the grating in index-matching oil. The inset shows the entire supercontinuum spectrum at both power levels.

At low power, third fiber 96 ($PCF_2$) does not act non-linearly and the supercontinuum excites linear core-to-cladding coupling resonances, leading to the sharp dips in the spectrum visible at 863 and 887 nm. By contrast, at the higher power more energy is transferred into the spectral region around these resonances. The core-to-cladding loss resonance is transformed by the self-phase modulation in PCF$_2$ into a dramatic 7.5 dB narrowband spectral enhancement, in close agreement with modelling results. The dashed curves A', B' in FIG. 10 show the corresponding spectra acquired when second fiber 94 with the LPG is immersed in a fluid of refractive index 1.45, matching that of the fiber cladding. At low power (dashed curve A') the loss resulting from coupling to the cladding mode has vanished. At the higher power (dashed curve B'), when the enhancement mechanism is active, the presence of the fluid causes the enhancement feature to disappear.

Figure 11:
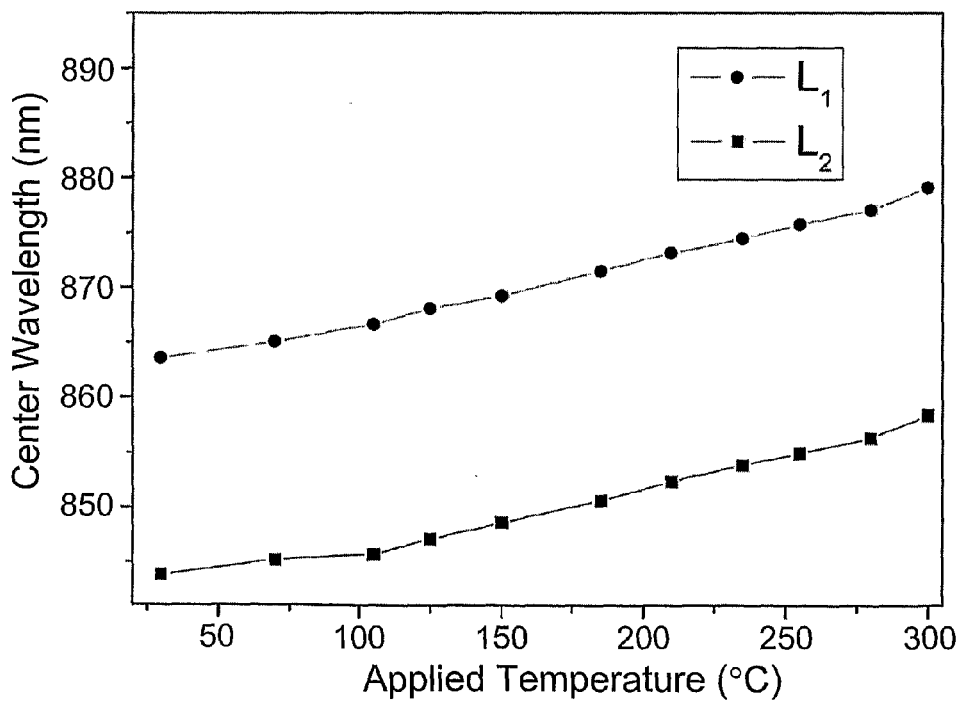
FIG. 11 is a plot of center wavelength (nm) as a function of applied temperature (° C.) measure with the device of FIG. 7, illustrating the thermal tunability of the enhancement.

FIG. 11 is a plot of center wavelength (nm) as a function of applied temperature (° C.), illustrating the thermal tunability of the enhancement. Two resonances initially at 845 and 864 nm ($L_1$ and $L_2$, respectively) were monitored as the temperature of the sample was increased.

Figure 12:
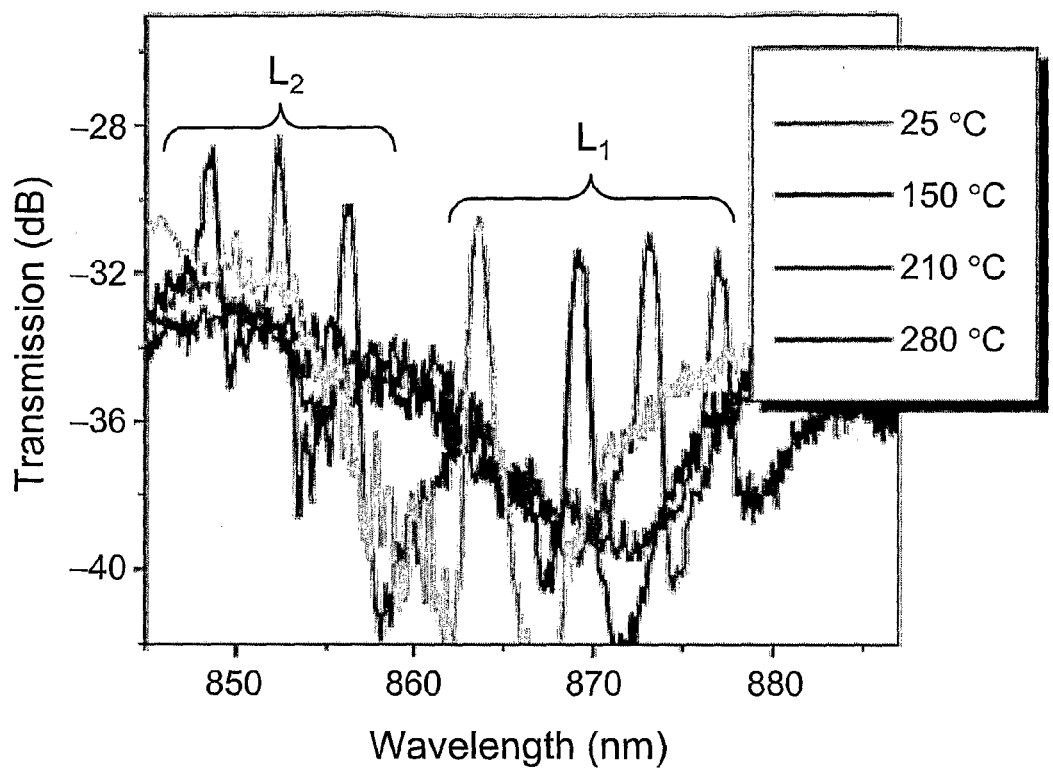
FIG. 12 is comparable to FIG. 11, and comprises spectra acquired with the device of FIG. 7 at several temperatures, showing that the spectral enhancement peaks can be tuned over a bandwidth of 35 nm.

FIG. 12 presents comparable data, but comprises spectra measured with device 90 at several temperatures. FIGS. 11 and 12 show that the spectral enhancement peaks can be tuned—in combination—over a bandwidth of 35 nm. (For clarity, the spectral enhancement peaks labeled $L_1$ in FIG. 12 correspond, from left to right, to 25° C., 150° C., 210° C. and 280° C.; the spectral enhancement peaks labeled $L_2$ correspond, from left to right, to 150° C., 210° C. and 280° C.)

Having shown that the enhancement of the supercontinuum can be tuned using LPGs, the measured spectra can be compared to those reported earlier using FBGs. Taking the results of Li et al. [10], it can be noted firstly that the spectrum shown in FIG. 10 is affected by the LPG over tens of nanometres, whereas the effect of the FBG in [10] is restricted to a much narrower spectral range. This is because the LPG resonance has a broader spectral region of influence than does an FBG. Also, whilst Li et al. [10] observed a single enhancement of up to a maximum of 10-15 dB, in this example a number of enhancement peaks were seen, each of which was somewhat lower (up to approximately 7.5 dB). The decreased maximum enhancement is understood to be due to both the broader spectral influence of the LPG, and also to splice losses in the device 90, which amounted to 2.5 dB. Simulations showed that, without splice losses, the maximum enhancement would be substantially higher.

The manipulation of the spectral power density by non-linear optical processes and external control thus constitutes a novel approach in waveguide-based non-linear optics. The non-linear interaction between the pulse and the fiber can be modified in real time without the need to couple light out of the fiber and back into it. The method could be used to increase the flexibility of optical frequency chains for frequency metrology, or, in telecommunications, permit tunable power transfer in spectrally sliced wavelength division multiplexing [8].

As discussed above in the context of component 22 for tunably creating a phase feature (see FIG. 5), according to certain embodiments of the present invention, spectral enhancement may be effected in standard telecommunications fiber by imposition of an acoustic long period fibre grating (LPFG), such as in a frequency-shifted soliton.

A LPFG is a resonant structure imposed onto an optical fiber, which couples light between the fundamental guided mode and a forward-propagating mode of the cladding of the fiber. The condition for resonance is that the perturbation have a period $\Lambda=\lambda/(n_{core}-n_{clad})$ for a given wavelength $\lambda$, core refractive index $n_{core}$ and cladding refractive index $n_{clad}$. For telecommunications SMF28 fiber and operation in the 1550 to 1650 nm wavelength region the resonant period is of the order of 0.5 to 1 mm. A suitable periodic perturbation is a travelling flexure wave created using an RF driven piezoelectric acoustic transducer. This technique has advantages of flexibility and ease of use as the wavelength of operation and the strength of the coupling are controlled electronically.

Figure 13:
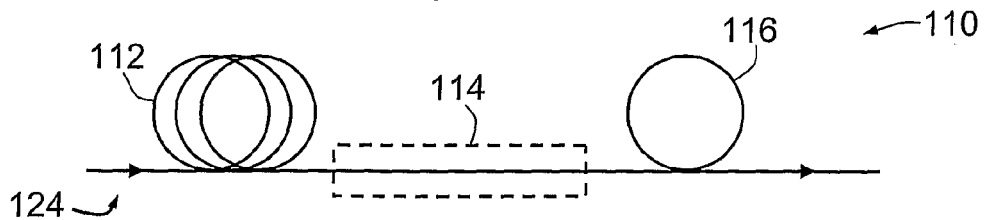
FIG. 13 is a schematic view of an apparatus for providing an enhanced optical supercontinuum according to a fifth embodiment of the present invention.
Figure 14:
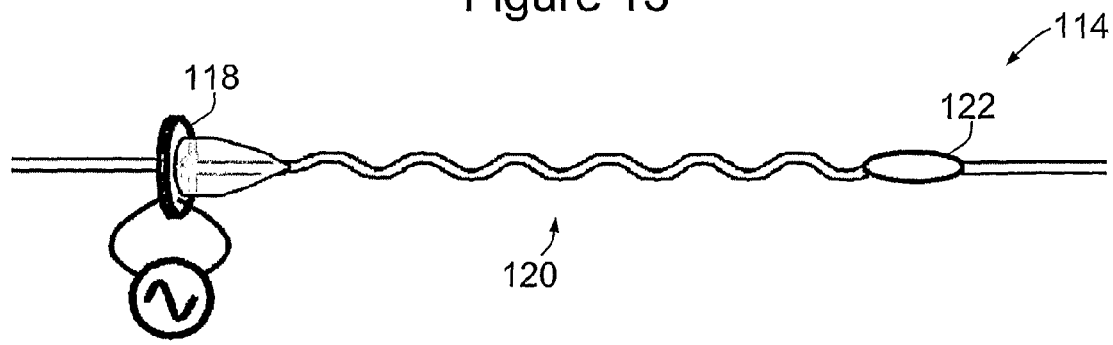
FIG. 14 is a more detailed schematic view of the acoustic LPFG of the apparatus of FIG. 13.

FIG. 13 is a schematic view of an apparatus for enhancing optical supercontinuum 110 according to this approach. Apparatus 110 comprises (in order of the optical path) 40 m of SMF28 optical fiber 112, an acoustic LPFG 114 and six meters of SMF28 optical fiber 116. FIG. 14 is a more detailed schematic view of acoustic LPFG 114, which comprises an RF driven piezoelectric acoustic transducer 118 (with an acoustic frequency of 1662 kHz) for generating the travelling flexure wave 120, followed by an acoustic damper 122.

In use, an input pulse 124 is introduced as shown; in the six meter SMF28 fiber 112, two thirds of the initial power of the input pulse 124 evolves into a fundamental soliton, which is red-shifted to 1615 nm owing to Raman self-action. When the Raman shifted soliton passes the acoustic LPFG 114, whose resonance wavelength is set to 1615 nm, a narrow loss resonance is created. The six metres of SMF28 116 after LPFG 114 provides sufficient non-linear phase shift to transform the spectral dip at the resonance of LPFG 114 into spectral enhancement.

EXAMPLE 2

Figure 15:
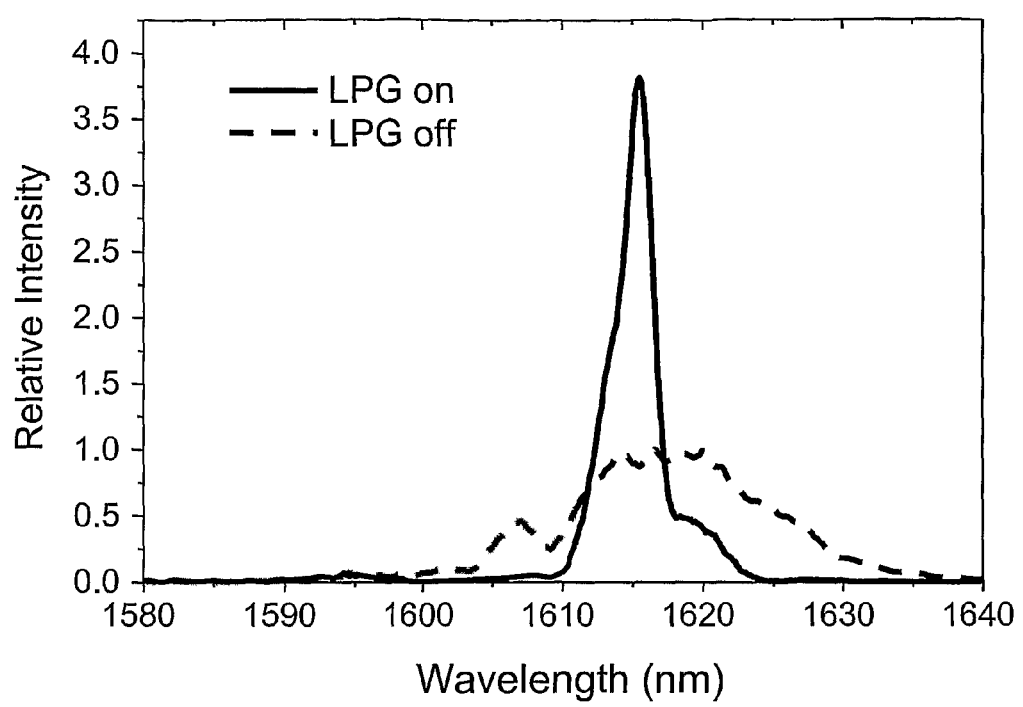
FIG. 15 is a plot of spectra a Raman shifted soliton collected with the apparatus of FIG. 13, both with the acoustic LPFG turned on and turned off.

Apparatus 110 was constructed and operated in this manner. FIG. 15 is a plot of the resulting spectra of a Raman shifted soliton when the acoustic LPFG 114 was turned on (solid curve) and turned off (dashed curve). The spectra are plotted as intensity relative to the maximum of the latter case versus wavelength. An enhancement of a factor of approximately 3.6 (or 5.6 dB) is apparent at the center wavelength of the soliton due to the presence of the acoustic LPFG 114.

REFERENCES

1. J. K. Ranka, R. S. Windeler, and A. J. Stentz, Opt. Lett. 25 (2000) 25.
2. J. C. Knight, Nature 424 (2003) 827.
3. A. V. Husakou and J. Herrmann, Phys. Rev. Lett. 87 (2001) 203901.
4. J. M. Dudley, G. Genty, and S. Coen, Rev. Mod. Phys. 78 (2006) 1135.
5. D. J. Jones, S. A. Diddams, J. K. Ranka, A. Stentz, R. S. Windeler, J. L. Hall, and S. T. Cundiff, Science 288 (2000) 635.
6. T. Udem, R. Holzwarth, and T. W. Hänsch, Nature 416 (2002) 233.
7. I. Hartl, X. D. Li, C. Chudoba, R. K. Ghanta, T. H. Ko, J. G. Fujimoto, J. K. Ranka, and R. S. Windeler, Opt. Lett. 26 (2001) 608.
8. T. Morioka, K. Uchiyama, S. Kawanishi, S. Suzuki and M. Saruwatari, Electron. Lett. 31 (1995) 1064.
9. P. S. Westbrook, J. W. Nicholson, K. S. Feder, Y. Li, and T. Brown, Appl. Phys. Lett. 85 (2004) 4600.
10. Y. Li, F. C. Salisbury, Z. Zhu, T. G. Brown, P. S. Westbrook, K. S. Feder, and R. S. Windeler, Opt. Express 13 (2006) 998.
11. P. S. Westbrook and J. W. Nicholson, Opt. Express 14 (2006) 7610.
12. D. R. Austin, J. A. Bolger, C. M. de Sterke, B. J. Eggleton, and T. G. Brown, Opt. Express 14 (2006) 13142.
13. K. Kim, S. A. Diddams, P. S. Westbrook, J. W. Nicholson, and K. S. Feder, Opt. Lett. 31 (2006) 277.
14. A. Präkelt, M. Wollenhaupt, C. Sarpe-Tudoran, A. Assion, and T. Baumert, Appl. Phys. Lett. 87 (2005) 121113.

15. A. M. Vengsarkar, P. J. Lemaire, J. B. Judkins, V. Bhatia, T. Erdogan, and J. E. Sipe, J. Lightwave Technol. 14 (1996) 58.
16. U.S. Pat. No. 5,757,540 (Judkins et al.), published 26 May 1998.
17. B. H. Lee, Y. Liu, S. B. Lee, S. S. Choi, and J. N. Jang, Opt. Lett. 22 (1997) 1769.
18. P. St. J. Russell, J. Mod. Opt. 38 (1991) 1599.
19. Kan'an and Weiner, Journal of the Optical Society of America B15 (1998) 1242.
20. D. Yeom, J. A. Bolger, G. D. Marshall, D. R. Austin, B. T. Kuhlmey, M. J. Withford, C. M. de Sterke and B. J. Eggleton, Opt. Lett. 32 (2007) 1644.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to background art is not intended to imply that such art forms or formed a part of the prior art or of common general knowledge.

The invention claimed is:

1. A method for providing optical supercontinuum, comprising:
   receiving a supercontinuum spectrum produced by subjecting a laser pulse to supercontinuum generation;
   modifying the supercontinuum spectrum by creating a spectrally narrow phase feature within the supercontinuum spectrum, thereby producing a modified supercontinuum spectrum;
   making a modification to said modified supercontinuum spectrum by propagating said modified supercontinuum spectrum through an optical waveguide that effects supercontinuum generation; and
   controlling said modification by dynamically selecting a characteristic or position of the phase feature.

2. A method as claimed in claim 1, including making said modification to said modified supercontinuum spectrum by increasing said modified supercontinuum spectrum's energy in a vicinity of said phase feature.

3. A method as claimed in claim 1, including the subjecting of said laser pulse to said supercontinuum generation before the modifying of the supercontinuum spectrum by the creating of said spectrally narrow phase feature.

4. A method as claimed in claim 3, including performing said supercontinuum generation in a standard microstructured fiber.

5. A method as claimed in claim 3, including performing said supercontinuum generation in an optical fiber with a dispersion zero close to an operating wavelength of said laser pulse's source.

6. A method as claimed in claim 1, including creating said phase feature within said supercontinuum spectrum while propagating said modified supercontinuum spectrum through said optical waveguide.

7. A method as claimed in claim 1, wherein dynamically selecting characteristics of the phase feature comprises tuning said phase feature.

8. A method as claimed in claim 1, including creating said phase feature with an acoustically created long period grating or other long period grating.

9. A method as claimed in claim 1, including creating said phase feature with an acoustically created long period grating and controlling the position of said phase feature by adjusting the acoustic frequency employed in creating the long period grating.

10. A method as claimed in claim 1, including creating said phase feature with a long period grating and either thermally tuning said phase feature or coupling light with said long period grating from a fundamental mode into higher order modes thereby creating a loss region and correspondingly said phase feature.

11. A method as claimed in claim 1, including creating said phase feature with a waveguide with a fixed long period grating.

12. A method as claimed in claim 1, including creating said phase feature with a tunable acoustic standing wave generated in a waveguide.

13. A method as claimed in claim 1, including creating said phase feature within said supercontinuum spectrum in a non-fiber based device.

14. A method as claimed in claim 13, including creating said phase feature within said supercontinuum spectrum in a separate spatial light modulator in a pulse spectral shaping assembly.

15. A method as claimed in claim 1, performed in distinct sections of waveguide, each selected to optimize or otherwise control the respective step performed therein.

16. A method as claimed in claim 1, including creating a tunable acoustic grating in a waveguide adapted to sustain said tunable acoustic grating, tuning said tunable acoustic grating to a desired wavelength, and creating said phase feature in said tunable acoustic grating.

17. A method as claimed in claim 1, wherein said optical waveguide comprises a birefringent optical waveguide and said method includes coupling polarisation modes of the optical waveguide and creating a loss region for one of the polarisation modes of the optical waveguide by creating said phase feature with a rocking filter in the optical waveguide.

18. A method as claimed in claim 1, including creating said phase feature with either a phase plate in a pulse spectral shaping assembly or a narrow loss feature in an image plane of a pulse spectral shaping assembly.

19. A supercontinuum enhancing apparatus, comprising:
   a phase feature generator that, upon receiving a supercontinuum spectrum produced by subjecting a laser pulse to supercontinuum generation, generates a modified supercontinuum spectrum by creating spectrally narrow phase feature within said supercontinuum spectrum, and outputs said modified supercontinuum spectrum; and
   an optical waveguide that receives said modified supercontinuum spectrum and makes a modification to said modified supercontinuum spectrum by subjecting said modified supercontinuum spectrum to supercontinuum generation;
   wherein the phase feature generator is controllable to effect dynamic selection of a characteristic or position of the phase feature and hence to control said modification.

20. An apparatus as claimed in claim 19, further comprising an initial optical waveguide adapted for supercontinuum generation, arranged to receive said laser pulse and to subject said laser pulse to supercontinuum generation.

21. An apparatus as claimed in claim 19, wherein said optical waveguide is selected to optimize spectral enhancement.

22. An apparatus as claimed in claim 19, wherein said phase feature generator comprises a spectral pulse shaper, a waveguide with a fixed long period grating, a tunable long period grating, an acoustically created long period grating, a waveguide with a tunable acoustic standing wave, a non-fiber based device, or a spatial light modulator in a pulse spectral shaping assembly.

23. A supercontinuum light source, comprising a supercontinuum enhancing apparatus as claimed in claim 19.

24. A light source as claimed in claim 23, wherein said light source performs frequency metrology and spectroscopy.

25. A light source as claimed in claim 23, wherein said light source has high intensity and spatial coherence, and has a tunable spectral enhancement that is brighter than other regions within the supercontinuum spectrum.

26. A method as claimed in claim 16, including creating said tunable acoustic grating with a threaded rod or other stress plate.

27. A method as claimed in claim 1, including:
controlling spectral enhancement or spectral power density of said modified supercontinuum spectrum by tuning said phase feature;
controlling said spectral enhancement in wavelength and magnitude of said modified supercontinuum spectrum by tuning said phase feature;
controlling said spectral power density of said modified supercontinuum spectrum by tuning said phase feature with one or more non-linear optical processes applied to an optical waveguide in which said phase feature is created; or
controlling said spectral power density of said modified supercontinuum spectrum by tuning said phase feature by heating an optical waveguide in which said phase feature is created or by changing a refractive index of a medium around said optical waveguide.

28. A tunable power transfer method, comprising providing optical supercontinuum as claimed in claim 1.

29. An apparatus as claimed in claim 19, wherein said apparatus manipulates spectral power density by one or more non-linear optical processes and external control.

30. An apparatus as claimed in claim 19, wherein said phase feature generator modifies said modified supercontinuum spectrum by effecting spectral enhancement of said modified supercontinuum spectrum or by manipulating spectral power density of said modified supercontinuum spectrum by tuning said phase feature.

31. A spectrally sliced wavelength division multiplexing method, comprising providing optical supercontinuum as claimed in claim 1.

32. A supercontinuum enhancing apparatus, comprising:
a phase feature generator that, upon receiving a supercontinuum spectrum produced by subjecting a laser pulse to supercontinuum generation, generates a modified supercontinuum spectrum by creating spectrally narrow phase feature within said supercontinuum spectrum, and outputs said modified supercontinuum spectrum; and
a birefringent optical waveguide having a rocking filter, said birefringent optical waveguide being arranged to receive said modified supercontinuum spectrum and make a modification to said modified supercontinuum spectrum by subjecting said modified supercontinuum spectrum to supercontinuum generation;
wherein the phase feature generator is controllable to effect dynamic selection of a characteristic or position of the phase feature and hence to control said modification, and
the apparatus couples polarisation modes of the birefringent optical waveguide and creates a loss region for one of the polarisation modes of the birefringent optical waveguide by creating said phase feature with said rocking filter.

* * * * *

UNITED STATES PATENT AND TRADEMARK OFFICE
CERTIFICATE OF CORRECTION

PATENT NO. : 8,718,411 B2 Page 1 of 1
APPLICATION NO. : 12/307795
DATED : May 6, 2014
INVENTOR(S) : Austin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1258 days.

Signed and Sealed this
Twenty-ninth Day of September, 2015

Michelle K. Lee
*Director of the United States Patent and Trademark Office*